(12) United States Patent
Uchimura et al.

(10) Patent No.: US 8,193,668 B2
(45) Date of Patent: Jun. 5, 2012

(54) MOTOR WITH SPEED REDUCTION MECHANISM CAPABLE OF ABSORBING AXIAL DEVIATION BETWEEN ARMATURE SHAFT AND WORM SHAFT

(75) Inventors: Hiroyuki Uchimura, Kiryu (JP); Hiroyuki Shibusawa, Kiryu (JP); Masaki Mita, Kiryu (JP)

(73) Assignee: Mitsuba Corporation, Kiryu-shi, Gunma (JP)

( * ) Notice: Subject to any disclaimer, the term of this patent is extended or adjusted under 35 U.S.C. 154(b) by 210 days.

(21) Appl. No.: 12/645,699

(22) Filed: Dec. 23, 2009

(65) Prior Publication Data
US 2010/0164333 A1    Jul. 1, 2010

(30) Foreign Application Priority Data

Dec. 25, 2008    (JP) ................................. 2008-331166

(51) Int. Cl.
*H02K 23/66* (2006.01)
*H02K 7/10* (2006.01)

(52) U.S. Cl. ........................ 310/68 B; 310/75 R; 310/83

(58) Field of Classification Search ................ 310/68 B, 310/75 R, 83
See application file for complete search history.

(56) References Cited

U.S. PATENT DOCUMENTS

| 2002/0047347 A1* | 4/2002 | Torii et al. | 310/68 B |
| 2007/0188032 A1* | 8/2007 | Toyoda et al. | 310/75 R |

FOREIGN PATENT DOCUMENTS

JP    2003278784 A    10/2003

* cited by examiner

*Primary Examiner* — Quyen Leung
*Assistant Examiner* — Jose Gonzalez Quinones
(74) *Attorney, Agent, or Firm* — McCormick, Paulding & Huber LLP (57) ABSTRACT

Detecting a rotation state of a worm wheel side with good accuracy while allowing play between an armature-shaft-side coupling member and a worm-shaft-side coupling member. The armature-shaft-side coupling member is provided together rotatably to the other end of an armature shaft; the worm-shaft-side coupling member is provided together rotatably to one end of a worm shaft; the armature-shaft-side coupling member and the worm-shaft-side coupling member are coupled together rotatably; and a sensor magnet is provided together rotatably to the worm-shaft-side coupling member. Therefore, the rotation state of the worm shaft can be detected with good accuracy. Even if the play is provided between the armature-shaft-side coupling member and the worm-shaft-side coupling member, this play does not affect the accuracy of detection of the rotation state of the worm shaft, thereby bringing no problem regarding accuracy of detection of a rotation state of a worm wheel side.

3 Claims, 9 Drawing Sheets

MOTOR WITH SPEED REDUCTION MECHANISM CAPABLE OF ABSORBING AXIAL DEVIATION BETWEEN ARMATURE SHAFT AND WORM SHAFT

CROSS-REFERENCE TO RELATED APPLICATION

Applicant hereby claims foreign priority benefits under U.S.C. §119 from Japanese Patent Application No. 2008-331166 filed on Dec. 25, 2008, the contents of which are incorporated by reference herein.

TECHNICAL FIELD OF THE INVENTION

The present invention relates to a motor with speed reduction mechanism, which has a gear section decelerating rotation of a motor section.

BACKGROUND OF THE INVENTION

Conventionally, used as a driving source for a power-window apparatus, sun-roof apparatus, or the like loaded on a vehicle such as an automobile is a motor with speed reduction mechanism, which can produce a large output although small in size. This motor with speed reduction mechanism is driven by rotation when an operation switch provided in a vehicle compartment or the like is operated by an operator, thereby driving an open/close body (such as a window glass or sun roof) for opening and closing.

Since an on-vehicle motor with speed reduction mechanism is loaded in a narrow restricted space such as a door or ceiling of the vehicle, downsizing the motor is an essential condition. Therefore, improving its layout property becomes possible irrespectively of a large-sized vehicle or small-sized vehicle, etc. For this reason, to downsize further the motor with speed reduction mechanism, a motor section and a gear section have been designed individually as separate elements.

For example, such design is carried out that: in the motor section, a small-diameter armature shaft with rigidity resistant to a predetermined output is adopted; and in the gear section, a worm shaft, which has a stiffness resistant to a large deceleration ratio and is larger in diameter than the armature shaft, is adopted. Therefore, the motor section and the gear section are downsized, as a result of which the motor with speed reduction mechanism can be further downsized.

As the motor with speed reduction mechanism in which the motor section and gear section are separate elements, for example, a technique disclosed in Patent Document 1 (Japanese Patent No. 3993010, particularly, FIG. 2) has been known. A motor (motor with speed reduction mechanism) described in Patent Document 1 has a motor main body (motor section) and a decelerating section (gear section), and is formed by fixing both members using a plurality of screws. The motor main body includes a small-diameter rotating shalt (armature shaft), and the decelerating section includes a worm shaft larger in diameter than the rotating shaft, and a worm wheel rotated by the worm shaft, wherein the rotating shalt and the worm shaft are coupled together via a clutch so as to make power transmittable to each other.

The clutch includes a driving-side rotator (armature-shaft-side coupling member) provided together rotatably to a coupling section of the rotating shaft, and a driven-side rotator (worm-shaft-side coupling member) shaped integrally with the worm shaft and coupled to the driving-side rotator, wherein a sensor magnet is mounted together rotatably in the driving-side rotator. A magnetic detecting element (magnetic sensor) is disposed near the sensor magnet, whereby a rotation state of a worm wheel side (output side) is detected.

SUMMARY OF THE INVENTION

However, according to the motor with speed reduction mechanism disclosed in Patent Document 1 mentioned above, on the clutch that couples the rotating shalt and the worm shaft together rotatably, the sensor magnet is mounted in the driving-side rotator. Therefore, there has been the problem that it is difficult for the magnetic detecting element to detect, with good accuracy, a rotation state of the worm wheel side (such as positional detection of the window glass) due to play between the driving-side rotator and the driven-side rotator. For this reason, how to eliminate the play between the driving-side rotator and the driven-side rotator has been reviewed. In this case, however, there arises such a problem as occurrence of necessity for manufacturing the driving-side rotator and the driven-side rotator with good accuracy, and a decrease in workability of assembling the motor with speed reduction mechanism, and the like, as a result of which an increase in manufacturing cost is brought.

An object of the present invention is to provide a motor with speed reduction mechanism, which can detect a rotation state of a worm wheel side with good accuracy while allowing play between an armature-shaft-side coupling member and a worm-shaft-side coupling member.

A motor with speed reduction mechanism according to the present invention comprises a motor section, and a gear section decelerating rotation of the motor section, the motor section including: a bottomed cylindrical yoke; an armature shaft rotatably provided in the yoke, one end of the armature shaft being supported by a bottom portion of the yoke; a commutator provided to an other end side of the armature shaft; a brush holder covering an opening portion of the yoke, mounted by being press-fitted into a cylinder of the yoke, and rotatably supporting the other end side of the armature shaft; a brush held by the brush holder and slidably contacting with the commutator; and an armature-shaft-side coupling member provided to the other end of the armature shaft so as to be rotatable together with the armature shaft, and the gear section including: a bottomed gear case mounted on the opening portion of the yoke; a worm shaft provided in the gear case so as to be rotatable with respect to the gear case, the other end of the worm shaft being supported by a bottom portion of the gear case, and a worm being formed on the worm shaft; a worm wheel provided in the gear case so as to be rotatable with respect to the gear case, and meshing with the worm of the worm shaft; a worm-shaft-side coupling member provided to one end of the worm shaft so as to be rotatable together with the worm shaft, the worm-shaft-side coupling member being coupled together rotatably to the armature-shaft-side coupling member; and a sensor magnet provided together rotatably to the worm-shaft-side coupling member.

The motor with speed reduction mechanism according to the present invention further comprises a connector member provided with a connector connecting portion, to which an external connector is connected, wherein the connector member is provided with a sensor substrate, which has a magnet sensor for detecting a rotation state of the sensor magnet; the sensor substrate and the connector connecting portion are provided in parallel toward a radial direction of the worm shaft; and the sensor substrate is disposed between the sensor magnet and the connector connecting portion.

The motor with speed reduction mechanism according to the present invention is such that the connector member is provided integrally with a clipping portion, which is clipped between the yoke and the gear case and which overlaps with the brush holder toward an axial direction of the worm shaft; and the sensor substrate is assembled to the clipping portion.

According to the present invention, the other end of the armature shaft is provided together rotatably to the armature-shaft-side coupling member; the one end of the worm shalt is provided together rotatably to the worm-shaft-side coupling member; the armature-shaft-side coupling member and the worm-shaft-side coupling member are coupled together rotatably; and the worm-shaft-side coupling member is provided together rotatably to the sensor magnet. Therefore, the rotation state of the worm shaft can be detected with good accuracy. For this reason, even if play is provided between the armature-shaft-side coupling member and the worm-shaft-side coupling member, this play does not affect the accuracy of detection of the rotation state of the worm shaft, thereby bringing no problem regarding the accuracy of detection of the rotation state of the worm wheel side. Further, since the play can be provided between the armature-shaft-side coupling member and the worm-shaft-side coupling member, workability of assembling the motor with speed reduction mechanism can be ensured, whereby an increase in manufacturing cost can be suppressed.

According to the present invention, the motor with speed reduction mechanism further includes the connector member provided with the connector connecting portion to which an external connector is connected; the connector member is provided with the sensor substrate that has the magnet sensor for detecting the rotation state of the sensor magnet; the sensor substrate and the connector connecting portion are provided in parallel toward the radial direction of the worm shalt; and the sensor substrate is disposed between the sensor magnet and the connector connecting portion. Therefore, by disposing the magnet sensor near the connector connecting portion, a terminal provided between the magnet sensor and the connector connecting portion can be shortened in length.

According to the present invention, the connector member is provided integrally with the clipping portion, which is clipped between the yoke and the gear case and overlaps with the brush holder toward the axial direction of the worm shaft; and the sensor substrate is assembled to the clipping portion. Therefore, the magnetic sensor can be provided so as to be spaced apart from the brush, and since electric noise, and abrasion powder, etc. are prevented from reaching the magnetic sensor, a decrease in detection sensitivity of the magnetic sensor can be suppressed.

DESCRIPTIONS OF THE PREFERRED EMBODIMENTS

An embodiment according to the present invention will be described in detail below with reference to the accompanying drawings.

Figure 1:
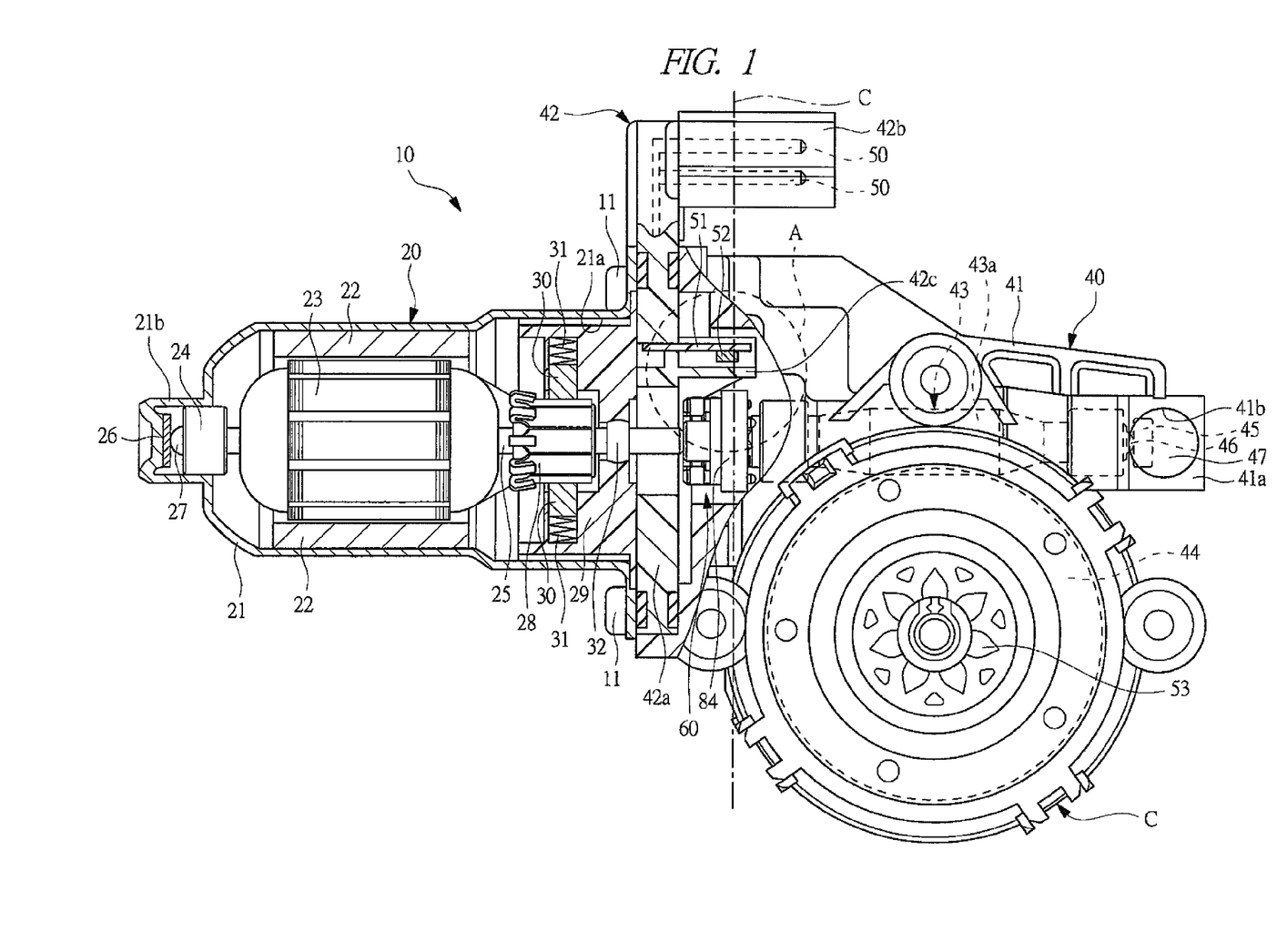
FIG. 1 is a partial sectional view of a motor with speed reduction mechanism according to the present invention.
Figure 2:
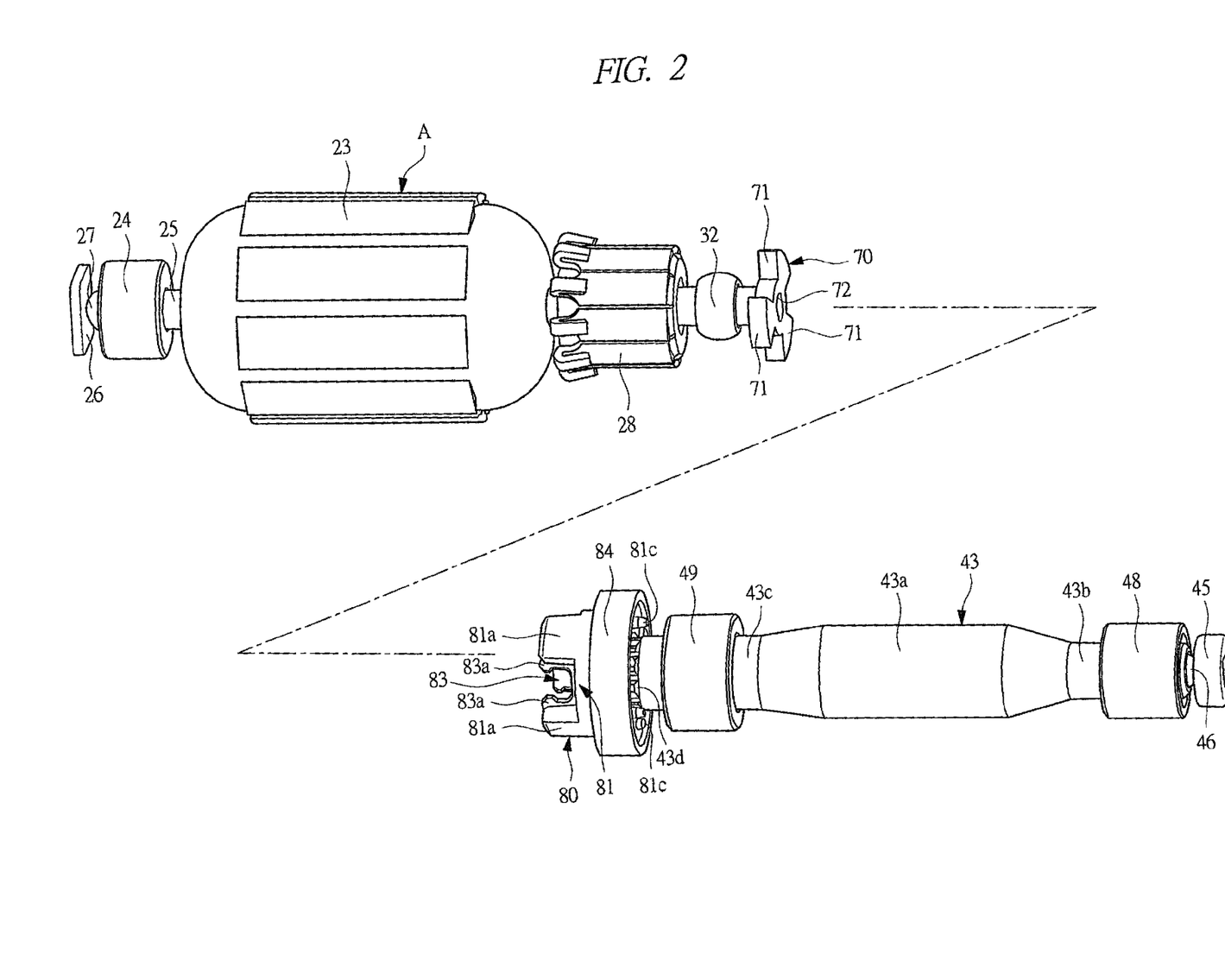
FIG. 2 is a perspective view showing an armature, coupling members, and a worm shaft in the motor with speed reduction mechanism of FIG. 1.
Figure 3:
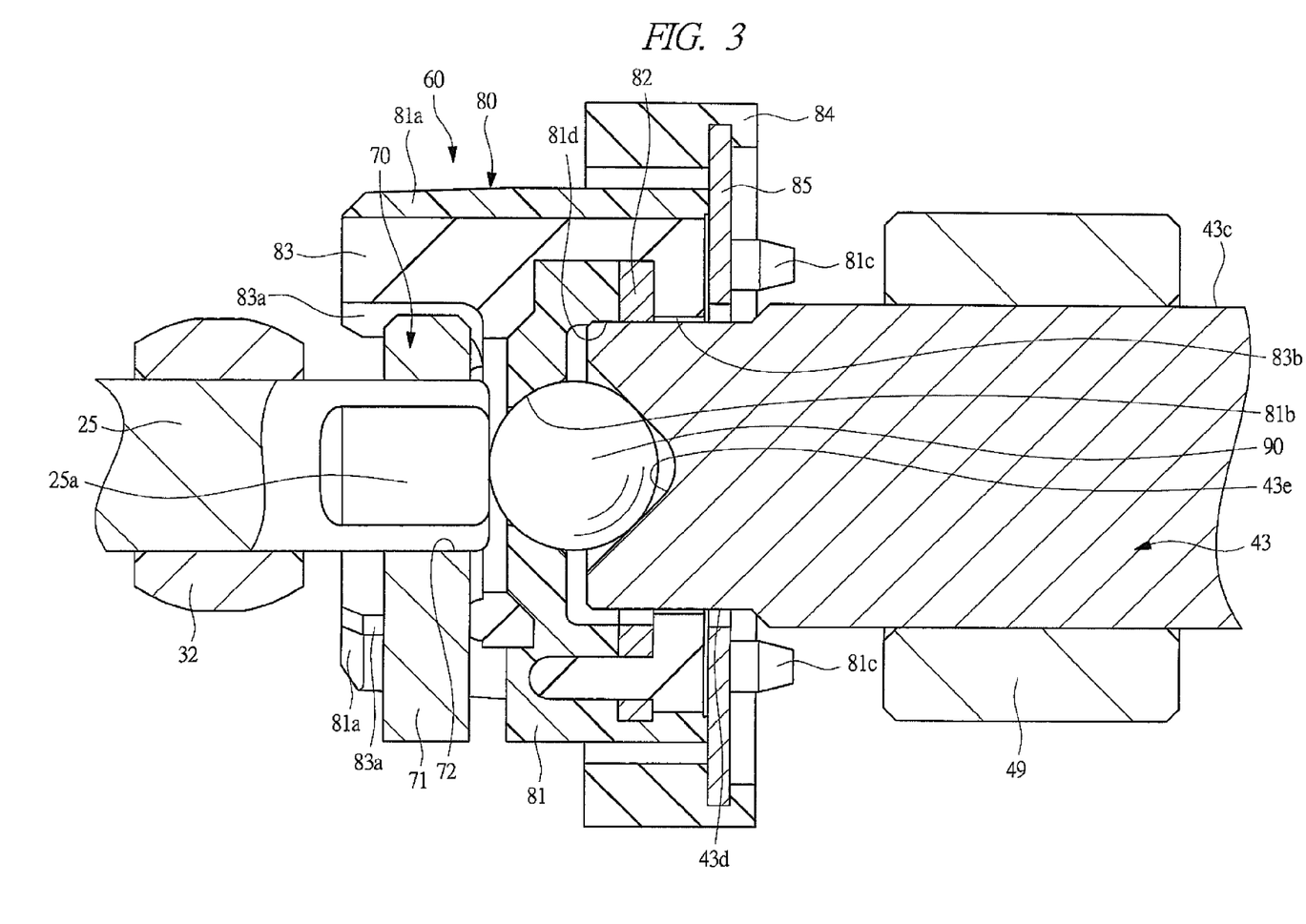
FIG. 3 is an enlarged sectional view for explaining each structure of the coupling members.
Figure 4A:
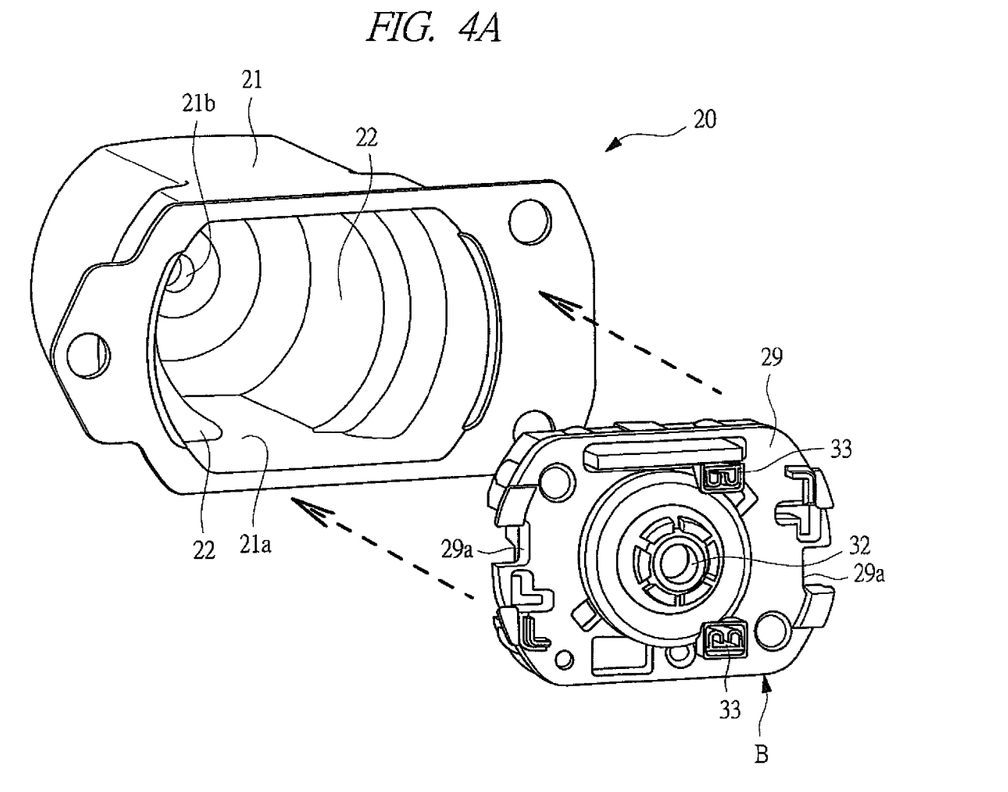
FIG. 4A is an explanatory drawing for explaining a procedure for assembling a motor section.
Figure 4B:
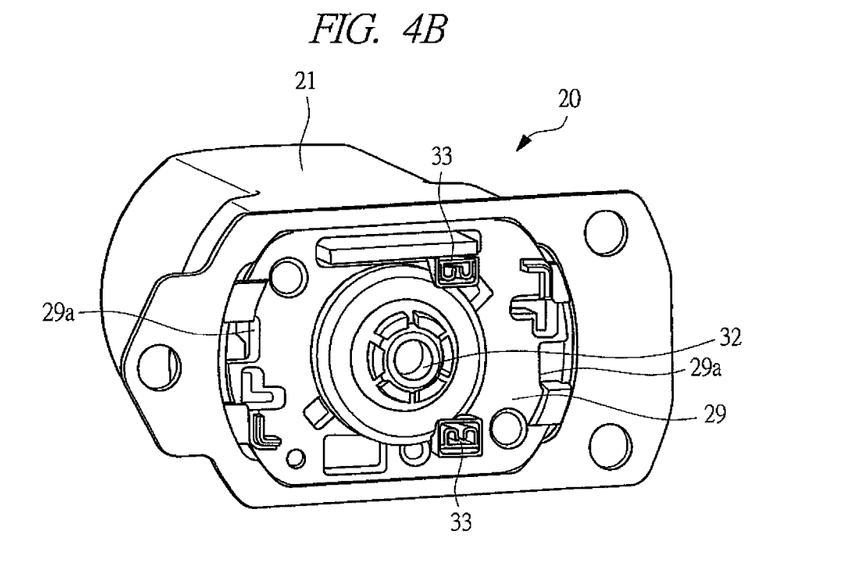
FIG. 4B is an explanatory drawing for explaining a procedure for assembling the motor section.
Figure 5A:
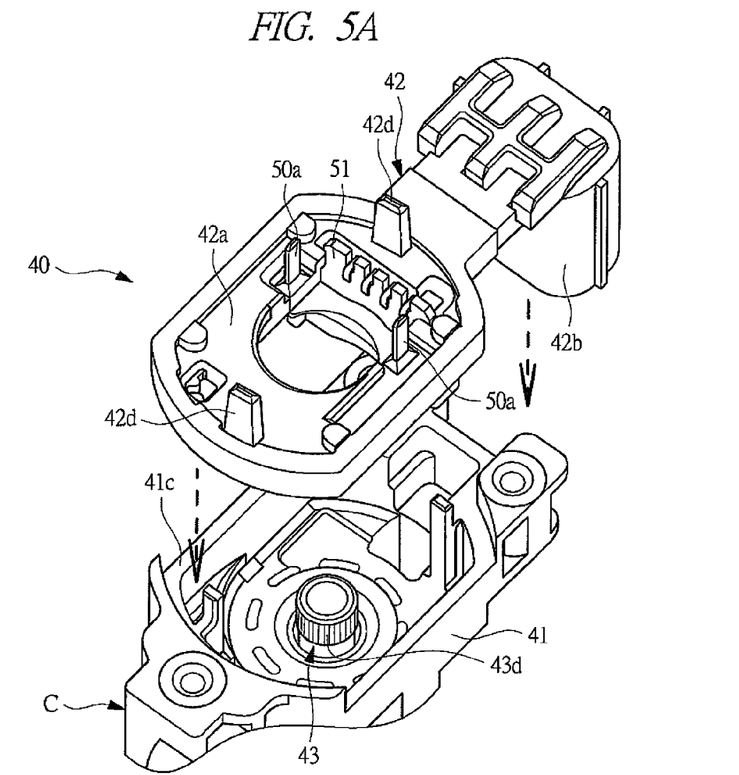
FIG. 5A is an explanatory drawing for explaining a procedure for assembling a gear section.
Figure 5B:
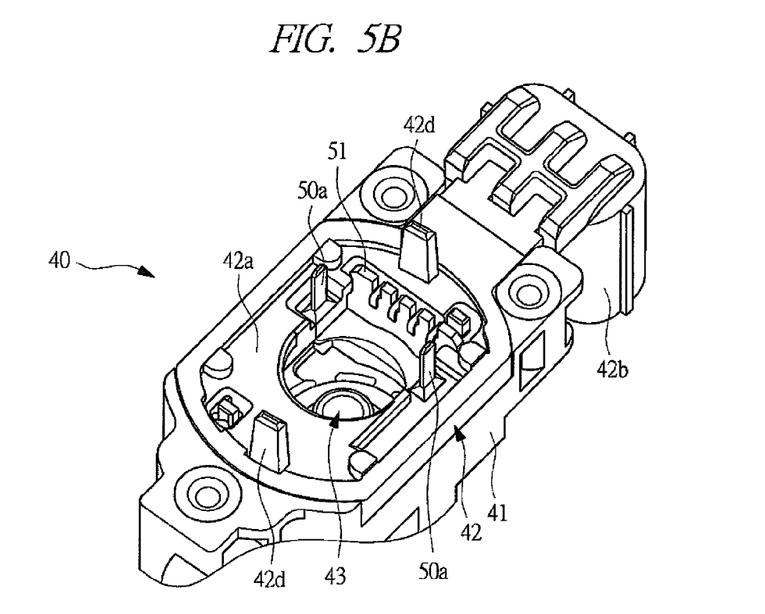
FIG. 5B is an explanatory drawing for explaining a procedure for assembling the gear section.
Figure 6:
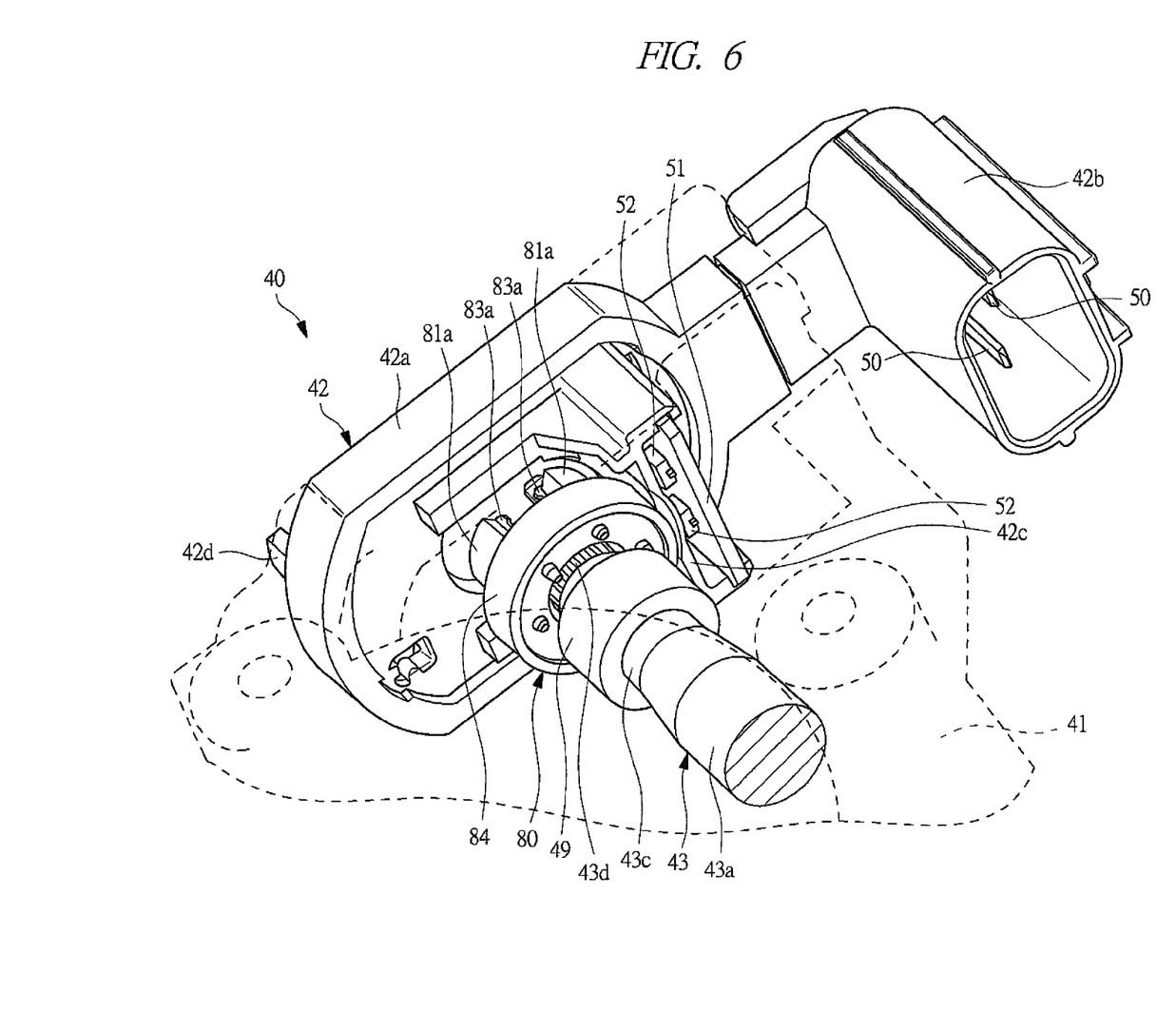
FIG. 6 is a perspective view of a connector member viewed from a gear case side.

FIG. 1 represents a partial sectional view of a motor with speed reduction mechanism according to the present invention; FIG. 2 represents a perspective view showing an armature, coupling members, and a worm shaft in the motor with speed reduction mechanism of FIG. 1; FIG. 3 represents an enlarged sectional view for explaining each structure of the coupling members; FIGS. 4A and 4B each represent an explanatory drawing for explaining a procedure for assembling a motor section; FIGS. 5A and 5B each represent an explanatory drawing for explaining a procedure for assembling a gear section; and FIG. 6 represents a perspective view of a connector member viewed from a gear case side.

As depicted in FIG. 1, a motor with speed reduction mechanism 10 is used as a driving source of a power-window apparatus (not shown) loaded on a vehicle such as an automobile, thereby driving a window regulator (not shown) that causes a window glass to rise and fall. The motor with speed reduction mechanism 10 is placed in a narrow restricted space (not shown) formed inside a door of the vehicle, and therefore has such a shape as to suppress a thickness dimension extending from a front direction to a depth direction in FIG. 1.

The motor with speed reduction mechanism 10 includes a motor section 20, and a gear section 40 that decelerates rotation of the motor section 20. These motor section 20 and gear section 40 are integrated (unitized) with a plurality of fastening screws 11.

The motor section 20 includes a yoke 21 formed into a bottomed cylindrical shape so as to have an opening 21a by performing a press (deep-drawing) processing to a steel plate made of a magnetic material. An outer shape of the yoke 21 is formed by a pair of arc-shaped surfaces and a pair of flat surfaces connecting these arc-shaped surfaces. The yoke 21 has a substantially oval cross section. Inside the yoke 21 corresponding to the pair of arc-shaped surfaces, a pair of magnets 22 opposed to each other is disposed. Provided inside each magnet 22 is an armature 23 around which a coil (not shown) is wound. The armature 23 becomes rotatable inside the yoke 21.

A bottom portion side (left side in Figure) of the yoke 21 is formed into a stepped shape, and its stepped portion is provided with a bottomed cylinder portion (bottom portion) 21b smaller in diameter than a main body of the yoke 21. A first radial bearing 24 is mounted in the bottomed cylinder portion 21b by a press-fitting, and the first radial bearing 24 rotatably supports one end side (left side in Figure) of an armature shaft 25. A first thrust bearing 26 is disposed in the bottomed cylinder portion 21b, and a first steel ball 27 is provided between the first thrust bearing 26 and one end of the armature shalt 25. Thus, the bottomed cylinder portion 21 b rotatably supports the one end of the armature shalt 25 via the first radial bearing 24, first thrust bearing 26, and first steel ball 27.

The armature shaft 25 penetrates through and is fixed to a rotation center of the armature 23, and a commutator 28 is provided near the armature 23 located on the other end side (right side in Figure) of the armature shaft 25. An end portion of the coil wound around the armature 23 is electrically connected to the commutator 28, and a pair of brushes 30 held by a brush holder 29 slidably contacts with an outer circumferential portion of the commutator 28. Each brush 30 is pressed by a spring member 31 with a predetermined pressure in a radial direction regarding a rotation direction of the commutator 28. By a driving current being supplied from an on-vehicle controller (not shown) to each brush 30, a rotary force (electromagnetic force) is created around the armature 23, whereby the armature shaft 25 rotate with a predetermined revolution speed/rotating torque.

The other end of the armature shaft 25 is provided with, as depicted in FIG. 3, a two-way taking portion 25a having a pair of flat surfaces (in which only one on a front side is depicted in Figure) which are opposed to each other toward a radial direction of the armature shaft 25. Fixed to the two-way taking portion 25a is an armature-shaft-side coupling member 70 that forms a linking member 60.

The brush holder 29 is formed into a substantially oval shape according to an inner shape of an opening portion 21a of the yoke 21, and is press-fitted and fixed so that its entity enters into the opening portion 21a (inside a cylinder of the yoke 21). In addition to each brush 30 and each spring member 31, the brush holder 29 includes a second radial bearing 32, wherein the second radial bearing 32 is mounted in an approximately center portion of the brush holder 29. The second radial bearing 32 rotatably supports the other end side of the armature shaft 25.

Thus, the first radial bearing 24, first thrust bearing 26, and first steel ball 27 are provided to the one end side of the armature shaft 25, and by providing the second radial bearing 32 to the other end side of the armature shaft 25, the armature shaft 25, that is, the armature 23 can smoothly rotate almost without causing rotational resistance.

As depicted in FIGS. 4A and 4B, a pair of female terminals 33 is attached to the brush holder 29 so as to sandwich the second radial bearing 32 therebetween. The pair of female terminals 33 is disposed at a position, which is offset from a line perpendicularly crossing a pair of flat surfaces in an outer shape of the brush holder 29 among lines passing through the second radial bearing 32, toward any one of arc-shaped surfaces in the outer shape of the brush holder 29. One end side of each female terminal 33 is electrically connected to each brush 30 via a wiring (not shown), and the other end side of each female terminal 33 is electrically connected to a part (male terminal 50a) of the other end side of each of terminals 50 embedded in a connector member 42.

As depicted in FIG. 1, the gear section 40 includes a gear case 41, and the connector member 42 attached to the gear case 41. The gear case 41 is formed into a bottomed shape by an injection-molding of a resin material such as plastic, and the gear case 41 is attached to the opening portion 21a of the yoke 21 via the connector member 42. Rotatably received inside the gear case 41 are a worm shaft 43, with an outer circumferential portion of which a worm portion 43a (not shown in detail) is shaped integrally, and a worm wheel 44 that has gear tooth (not shown) meshing with the worm portion 43a.

The worm shaft 43 is provided concentrically with the armature shaft 25, and one end of the worm shaft 43 is coupled together rotatably to the other end of the armature shaft 25 via the linking member 60. A second thrust bearing 45 provided in a bottom portion 41a of the gear case 41 is disposed on the other end side of the worm shaft 43, and a second steel ball 46 is provided between the second thrust bearing 45 and the other end of the worm shaft 43. These second thrust bearing 45 and second steel ball 46 are elements that smoothly rotate the worm shaft 43. Thus, the other end of the worm shaft 43 is rotatably supported by the bottom portion 41a via the second thrust bearing 45 and the second steel ball 46.

A filling hole 41b is provided on the bottom potion 41a side of the gear case 41, and this filling hole 41b is filled with a resin material 47 for axial-directional positional adjustment of the second thrust bearing 45. That is, by filling the filling hole 41b with the resin material 47 with a predetermined pressure after assembly of the motor with speed reduction mechanism 10, the worm shaft 43 and the armature shaft 25 are caused to move axially via the second thrust bearing 45, whereby axial-directional play of the worm shaft and the armature shaft 25 can be eliminated.

Incidentally, a way of eliminating the axial-directional play between the worm shalt 43 and the armature shaft 25 is not limited to that described above, and may be a way of providing an adjusting screw (not shown) to be screwed into the bottom portion 41a of the gear case 41, adjusting a screwing amount of the adjusting screw into the gear case 41, and thereby moving the worm shalt 43 and the armature shaft 25 axially.

Provided on both axial-directional end sides of the worm portion 43a on the worm shaft 43 is, as depicted in FIG. 2, a pair of supported sections 43b and 43c, each of which is set so as to have a diameter dimension smaller than that of the worm portion 43a. The supported portions 43b and 43c are rotatably supported by a third radial bearing 48 and a fourth radial bearing 49, which are provided in the gear case 41, respectively.

A serration portion 43d is provided integrally with one end side of the worm shaft 43, and a worm-shaft-side coupling member 80 forming the linking member 60 is provided together rotatably to the serration portion 43d. A plurality of concaves and convexes (see FIG. 8) arranged along a circumferential direction of the worm shalt 43 are formed on an outer circumferential side of the serration portion 43d, and formed into substantially gear tooth shapes. A substantially cone-shaped concave portion 43e is formed radially inside the serration portion 43d, whereby a third steel ball 90 forming the linking member 60 enters into and contacts with the concave portion 43e.

As depicted in FIG. 1, the connector member 42 is formed into a predetermined shape by an injection-molding of a resin material such as plastic, and includes a clipping portion 42a and a connector connecting portion 42b. The clipping portion 42a is formed into a substantially oval shape according to the shape of the yoke 21, is clipped between the other end of the yoke 21 located on an opening side and one end of the gear case 41, and overlaps with the brush holder 29 toward an axial direction of the worm shaft 43.

The connector connecting portion 42b is provided integrally with the clipping portion 42a to extend from the clipping portion 42a toward a gear case 41 side. An external connector (not shown) on a vehicle side is inserted from the gear case 41 side into and connected to the connector connecting portion 42b.

The plurality of terminals 50 are embedded into the clipping portion 42a and the connector connecting portion 42b by an insertion-molding so as to go across both members. One end of each terminal 50 is disposed inside the connector connecting portion 42*b* to be electrically connected to each terminal (not shown) of the external connector. The other ends of the respective terminals 50 partly protrude, as depicted in FIGS. 5A and 5B, from the clipping portion 42*a* and form the pair of male terminals 50*a*, and each male terminal 50*a* is electrically connected to each female terminal 33 (each brush 30) of the brush holder 29. Also, the respective other ends of the remaining terminals 50 are electrically connected to a sensor substrate 51.

The sensor substrate 51 is provided on the gear case 41 side of the clipping portion 42*a*. The sensor substrate 51 is assembled to the clipping portion 42*a* by being inserted into the clipping portion 42*a* from the axial direction of the worm shalt 43. A pair of Hall ICs (magnetic sensors) 52 is mounted on the sensor substrate 51 and, as depicted in FIGS. 1 and 6, each Hall IC 52 is opposed to a radial-directional exterior of a sensor magnet 84 provided on the worm-shaft-side coupling member 80, via a wall portion 42*c* provided integrally with the clipping portion 42*a*.

Each Hall IC 52 is disposed at a position that is away from the clipping portion 42*a* of the sensor substrate 51 toward the gear case 41 side, namely, is disposed at a position spaced away from each brush 30 in the brush holder 29. This makes it difficult for electrical noise etc. occurring at each brush 30 to reach each Hall IC 52. Also, the wall portion 42*c*, which is disposed between each Hall IC 52 and each brush 30, makes it difficult for abrasion powder etc. produced by each brush 30 to reach each Hall IC 52.

The connector connecting portion 42*b*, sensor substrate 51, and sensor magnet 84 are provided in parallel on a reference line "C" extending in a radial direction of the worm shalt 43, as depicted in FIG. 1. The sensor substrate 51 is disposed between the sensor magnet 84 and the connector connecting portion 42*b*. Therefore, by disposing the connector connecting portion 42*b*, sensor substrate 51, and sensor magnet 84 so as to be close to one another, a distance between the connector connecting portion 42*b* and the sensor substrate 51 is made short, whereby a length dimension of each terminal 50 embedded into the connector member 42 is suppressed so as to have the required minimum length dimension.

Each Hall IC 52 is electrically connected to the on-vehicle controller via each terminal 50 and each terminal of the external connector. Further, by using the on-vehicle controller to detect the number of times of and appearance timings of rectangular wave signals generated from each Hall IC 52 according to rotation of the sensor magnet 84, the number of revolutions of and rotational positions, etc. (rotation state) of the worm shalt 43 are detected. However, as a magnetic sensor, an MR sensor (magnetic resistance element) may be used instead of each Hall IC 52.

A supporting shaft for supporting rotation of the worm wheel 44 is formed in the gear case 41. Also, the worm wheel 44 is provided together rotatably to a pinion 53 as an output shaft, as depicted in FIG. 1, and a gear (not shown) forming the window regulator meshes with the pinion 53. The pinion 53 is rotatably supported by the supporting shaft formed in the gear case 41 similarly to the worm wheel 44. Further, the rotation of the motor section 20, that is, the rotation of the worm shaft 43 based on the rotation of the armature shaft 25 is decelerated by the worm wheel 44, and a high-torque output is transmitted from the pinion 53 to the gear of the window regulator. Note that the worm shaft 43 and the worm wheel 44 configure a speed reduction mechanism in the present invention.

Provided between the other end of the armature shaft 25 and the one end of the worm shaft 43 is the linking member 60 that together rotatably couples both members. The linking member 60 includes the armature-shaft-side coupling member 70, the worm-shaft-side coupling member 80, and the third steel ball 90, as depicted in FIG. 3.

As depicted in FIGS. 2 and 3, the armature-shaft-side coupling member 70 is formed into a predetermined shape by performing a press processing (punching processing) to a steel material, and the armature-shaft-side coupling member 70 is provided with three protruding portions 71 that radiately extend radially outwardly. The respective protruding portions 71 are provided at equally spaced intervals (120-degree intervals) along a circumferential direction, and formed into substantially sectorial shapes.

A fixture hole 72 having a substantially rectangular shape is provided in a center portion of the armature-shaft-side coupling member 70, and the two-way taking portion 25*a* of the armature shaft 25 is press-fitted into and fixed to the fixture hole 72. Therefore, the armature-shaft-side coupling member 70 is firmly fixed to the armature shaft 25 without having any play with respect to the armature shaft, thereby making it possible to rotate together with the armature shaft 25.

As depicted in FIGS. 2 and 3, the worm-shaft-side coupling member 80 includes a main body portion 81, a rigid member 82, and a cushion member 83. The main body portion 81 is formed into a substantially bottomed shape, and a bottom portion side of the main body portion 81 is provided with three protruding portions 81*a* (only two are depicted in Figure) that protrude from the main body portion 81 to one end side (left side in Figure).

Figure 7A:
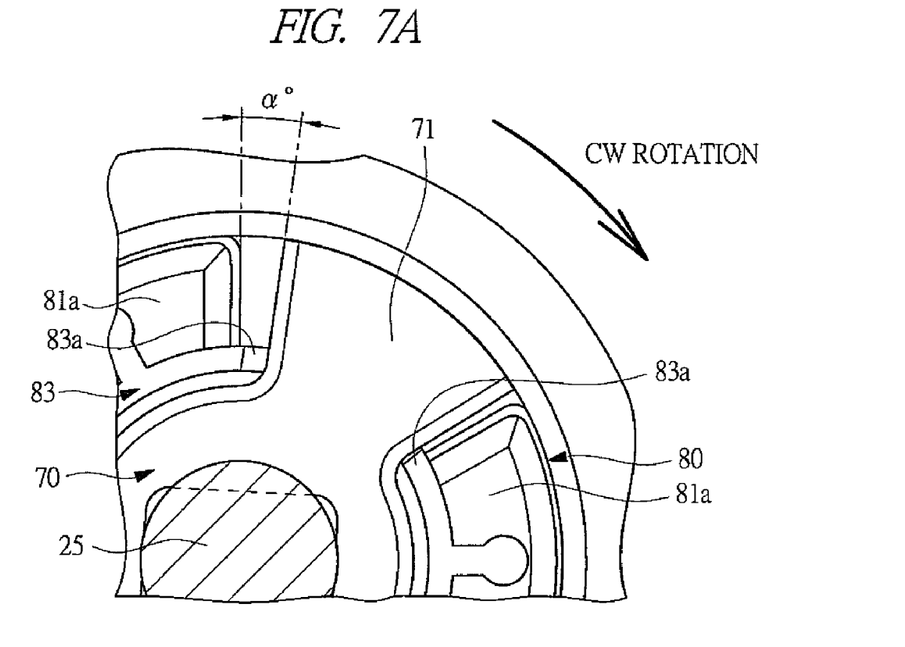
FIG. 7A is an explanatory drawing for explaining a relative rotation state of an armature-shaft-side coupling member with respect to a worm-shaft-side coupling member.
Figure 7B:
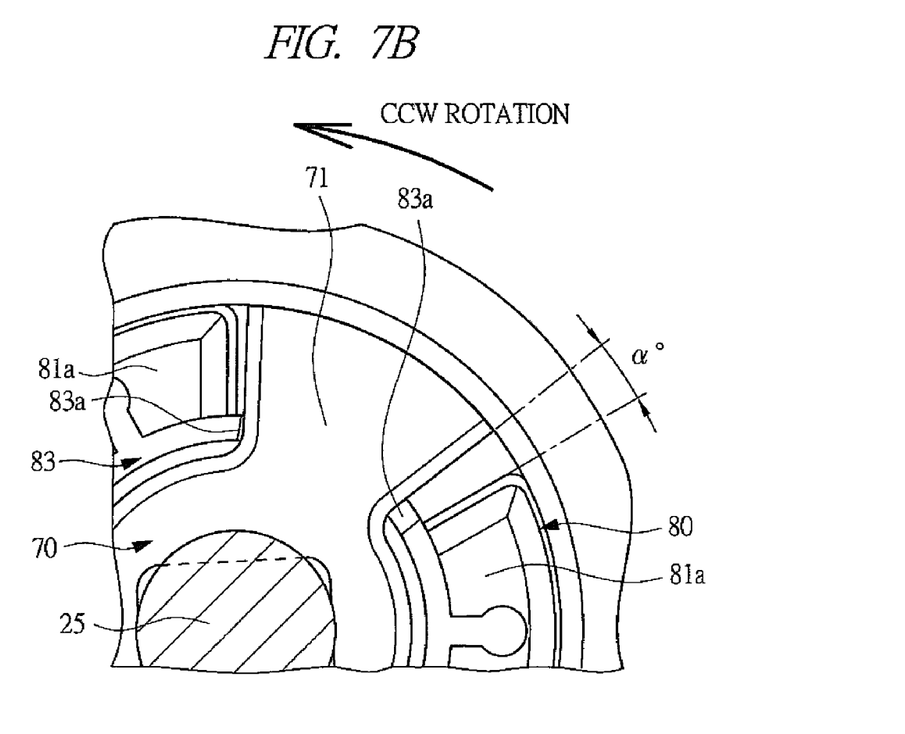
FIG. 7B is an explanatory drawing for explaining a relative rotation state of the armature-shaft-side coupling member with respect to the worm-shaft-side coupling member.

The respective protruding portions 81*a* are provided at equally spaced intervals (120-degree intervals) along a circumferential direction of the main body portion 81, and formed into substantially sectorial shapes. Each of the protruding portions 71 of the armature-shaft-side coupling member 70 is inserted into a circumferential-directional space between the respective protruding portions 81*a*, whereby the worm-shaft-side coupling member 80 and the armature-shaft-side coupling member 70 is coupled together rotatably. A predetermined gap (play) is formed between each protruding portion 81*a* and each protruding portion 71 along the circumferential direction, and the worm-shaft-side coupling member 80 and the armature-shaft-side coupling member 70 can be relatively rotated within a predetermined angle range of a degrees (see FIG. 7). Also, the worm-shaft-side coupling member 80 and the armature-shaft-side coupling member 70 have a predetermined gap (play) along a radial direction.

Accordingly, when the motor with speed reduction mechanism 10 is assembled, the worm-shaft-side coupling member 80 and the armature-shaft-side coupling member 70 can be easily coupled together, whereby an assembling property is ensured. Also, an axial deviation between the armature shaft 25 and the worm shaft 43 can be absorbed.

On a bottom portion of the main body portion 81, a spherical portion 81*b* is formed. The radius of curvature of the spherical section 81*b* is set at a value approximately equal to the radius of curvature of the third steel ball 90, and the third steel ball 90 slidably contacts with the spherical portion 81*b*. Herein, the third steel ball 90 is provided between the armature shaft 25 and the worm shaft 43, and each of the other end of the armature shaft 25, the spherical portion 81*b* of the main body portion 81, and the concave portion 43*e* of the worm shaft 43 contacts with the third steel ball 90.

An opening side of the main body portion 81 is provided with six protrusions 81*c* (see FIG. 8) that protrude toward the other end side (right side in Figure) of the main body portion 81, and the respective protrusions 81*c* are provided at equally spaced intervals along the circumferential direction of the main body portion 81 and formed in substantially column shapes. Attached to each of the protrusions 81c is an attaching ring 85 of a sensor magnet 84 which is provided together rotatably around an outer circumference of the main body portion 81, that is, an outer circumference of the worm-shaft-side coupling member 80.

The sensor magnet 84 is formed of a bonded magnet etc. obtained by binding magnetic powder with a binder such as resin, and is integrally provided around an outer circumference of the metal attaching ring 85. The sensor magnet 84 is magnetized so that a plurality of magnetic poles (not shown) are alternately aligned along its circumferential direction, for example, like an arrangement of N, S, N, S, and . . . poles.

Formed inside the main body portion 81 is a concave/convex hole 81d having a plurality of concaves and convexes along the circumferential direction of the main body portion. An inner shape of the concave/convex hole 81d is approximately similar to an outer shape of the serration portion 43d provided on the worm shaft 43. The serration portion 43d is inserted into the concave/convex hole 81d via a micro-gap (not shown), and since the serration portion 43d has such a micro-gap, axial-directional deviation between the worm-shaft-side coupling member 80 and the worm shaft 43 can be absorbed.

The micro-gap between the concave/convex hole 81d and the serration portion 43d is set much smaller than the predetermined gap (play) formed between the worm-shaft-side coupling member 80 and the armature-shaft-side coupling member 70. Therefore, a relative rotatable angle formed by the concave/convex hole 81d of the worm-shaft-side coupling member 80 and the serration portion 43d of the worm shaft 43 is approximately 0 (zero) degree. That is, the worm-shaft-side coupling member 80 and the worm shaft 43 are together rotatable almost without rattling mutually therebetween.

The rigid member 82 is provided by an insertion-molding inside the main body portion 81 located near the opening side. The rigid member 82 is formed into a substantially disk shape by performing a press processing etc. to a steel plate, thereby playing a part of reinforcing the main body portion 81. An inner shape of the rigid member 82 is identical to that of the concave/convex hole 81d of the main body portion 81, and similarly to the concave/convex hole 81d, the serration portion 43d is inserted inside the rigid member 82 via the micro-gap.

The main body portion 81 is provided with the cushion member 83 by an injection-molding along an axial direction of the main body potion. The cushion member 83 is formed into a predetermined shape by: injecting a molten rubber material (molding material) with a predetermined pressure between an injection hole (not shown) provided to the main body portion 81 and a jig (not shown) that covers the main body portion 81; and then curing the rubber material.

Provided on one end side of the cushion member 83 are a plurality of swelling portions 83a that swell from both ends of each protruding portion 81a along a circumferential direction of the protruding portion. Each swelling portion 83a contacts with both ends of each protruding portion 71 along the circumferential direction of the protruding portion, in a state of coupling the armature-shaft-side coupling member 70 to the worm-shaft-side coupling member 80, and is elastically deformed. This prevents the armature-shaft-side coupling member 70 and the worm-shaft-side coupling member 80 from directly contacting with each other toward the circumferential direction, whereby occurrence of unusual sound (collision sound) is suppressed.

The other end side of the cushion member 83 is provided with a fitting portion 83b, which is fitted in the serration portion 43d of the worm shaft 43 by elastic deformation, and the fitting portion 83b is disposed at a position close to the rigid member 82. Since the fitting portion 83b is elastically deformed and bites into the serration portion 43d, the serration portion 43d is prevented from rattling inside the main body portion 81 (absorbs vibration), thereby suppressing the occurrence of unusual sound.

Next, a procedure for assembling the motor with speed reduction mechanism 10 will be described in detail with reference to the drawings.

[Assembling of Motor Section 20]

First, the armature 23 is fixed to the armature shaft 25 by press-fitting. Next, the commutator 28 is fixed to the armature shaft 25 by press-fitting. Then, a coil is wound around the armature 23 in a predetermined winding manner, and an end of the coil is electrically connected to the commutator 28. By doing so, a sub-assembly "A" (armature & armature-shaft assembly) depicted in FIG. 2 is completed.

Next, as depicted in FIGS. 4A and 4B, the yoke 21 is prepared, and also a sub-assembly "B" (brush-holder assembly) is prepared. Here, the sub-assembly B is completed by assembling each brush 30, each spring member 31, the second radial bearing 32, and each female terminal 33 to the brush holder 29 in another assembling process.

Next, the first thrust bearing 26 and the first radial bearing 24 are mounted into the bottomed cylinder portion 21b of the yoke 21, and the sub-assembly A is inserted in the yoke 21. Note that in FIGS. 4A and 4B, the first thrust bearing 26, the first radial bearing 24, and the sub-assembly A are omitted. Next, as indicated by dotted arrows in FIG. 4A, the sub-assembly B is caused to face to the yoke 21, and a two-way taking portion 25a side of the armature shaft 25 is inserted into the second radial bearing 32, whereby the sub-assembly B is mounted in the opening portion 21a of the yoke 21. Thereafter, the two-way taking portion 25a is press-inserted and fitted into the fixture hole 72 of the armature-shaft-side coupling member 70, whereby the motor section 20 is completed.

[Assembling of Gear Section 40]

First, the second thrust bearing 45 and the third radial bearing 48 are mounted in a bottom portion 41a side of the gear case 41. Next, the worm shaft 43 is assembled to the gear case 41, and the supported portion 43b located on the other end side of the worm shaft 43 is mounted in the third radial bearing 48. Note that at this time, the fourth radial bearing 49 is previously assembled to the supported section 43c located on the one end side of the worm shaft 43; and the worm shaft 43 is assembled to the gear case 41 and simultaneously the fourth radial bearing 49 is assembled to the gear case 41. Next, while the gear tooth of the worm wheel 44 meshes with the worm portion 43a, the worm wheel 44 is accommodated in the gear case 41.

Next, the worm-shaft-side coupling member 80 is attached to the serration portion 43d of the worm shaft 43. At this time, as depicted in FIG. 3, the third steel ball 90 is sandwiched between the spherical portion 81b and the concave portion 43e. Also, by heating each protrusion 81c after the attaching ring 85 is mounted on each protrusion 81c, each protrusion 81c and the attaching ring 85 are welded and fixed, whereby the sensor magnet 84 is attached to the main body portion 81. Therefore, a sub-assembly "C" (gear-case assembly) is completed (see FIG. 1).

Next, as indicated by dotted arrows in FIG. 5A, the connector member 42 is caused to face toward the sub-assembly C so that the connector connecting portion 42b is directed toward a sub-assembly C side, and then the clipping portion 42a is mounted in a mounting concave portion 41c formed in the gear case 41. By doing so, the gear section 40 is completed. Note that in FIGS. 5A and 5B, the worm-shaft-side coupling member 80 is omitted.

[Assembling of Motor with Speed Reduction Mechanism 10]

To assemble the motor with speed reduction mechanism 10, the completed motor section 20 and gear section 40 are first prepared. Then, as depicted in FIG. 2, the armature-shaft-side coupling member 70 located on a motor section 20 side and the worm-shaft-side coupling member 80 located on a gear section 40 side are opposed to each other. Thereafter, each protruding portion 71 of the armature-shaft-side coupling member 70 is inserted in a space between the respective protruding portions 81a of the worm-shaft-side coupling member 80 while each swelling portion 83a of the cushion member 83 is elastically deformed. By doing so, the armature-shaft-side coupling member 70 and the worm-shaft-side coupling member 80 are coupled together.

At this time, each male terminal 50a on the gear section 40 side is caused to face toward each female terminal 33 on a motor section 20 side, and further a pair of mounting convex portions 42d (see FIGS. 5A and 5B) formed at the clipping portion 42 is caused to face toward the pair of mounting concave portions 29a (see FIGS. 4A and 4B) formed in the brush holder 29. Thereafter, the yoke 21 and the gear case 41 are confronted with each other, whereby the motor section 20 and the gear section 40 are integrated by the fastening screws 11 (see FIG. 1). By doing so, the motor with speed reduction mechanism 10 is completed.

Next, an operation of the above-structured motor with speed reduction mechanism 10 will be described in detail with reference to the drawings.

Figure 8:
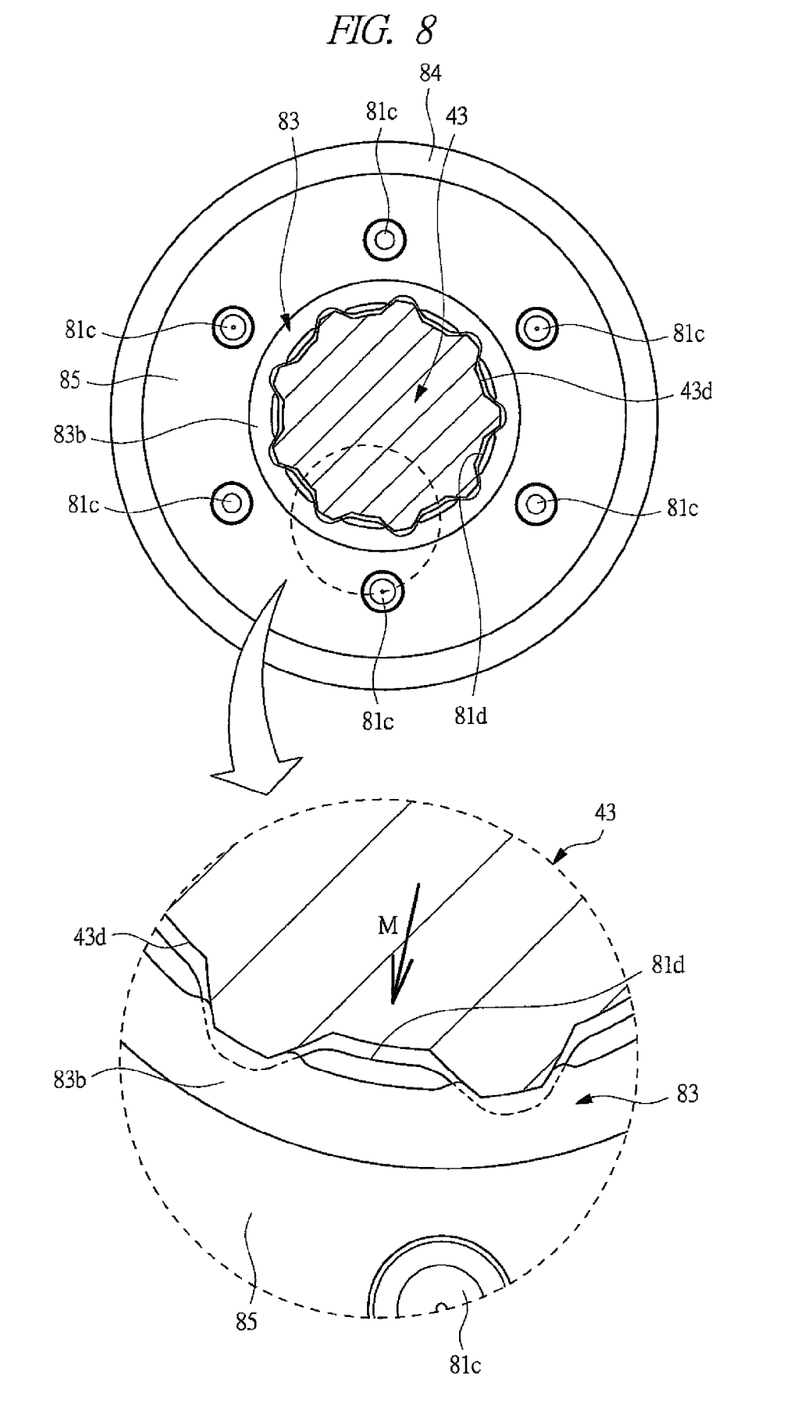
FIG. 8 is an explanatory drawing for explaining an eccentric state of the worm shalt with respect to the worm-shalt-side coupling member.

FIGS. 7A and 7B each represent an explanatory drawing for explaining a relative rotation state of the armature-shaft-side coupling member with respect to the worm-shaft-side coupling member; and FIG. 8 represents an explanatory drawing for explaining an eccentric state of the worm shaft with respect to the worm-shaft-side coupling member.

[CW Rotation]

When an operation switch (not shown) is operated to close the window glass, a predetermined driving current is supplied to each brush 30, and the armature shaft 25 rotates in a clockwise direction (CW rotation). Then, as depicted in FIG. 7A, the armature-shaft-side coupling member 70 also rotates in a CW rotation direction according to the CW rotation of the armature shaft 25, and each protruding portion 71 of the armature-shaft-side coupling member 70 comes near to each protruding portion 81a of the worm-shaft-side coupling member 80. At this time, since the swelling portion 83a of the cushion member 83 is disposed between each protruding portion 71 and each protruding portion 81 a, this swelling portion 83a serves as a shock absorber to suppress the occurrence of unusual sound. Then, a rotary force from the armature-shaft-side coupling member 70 is transmitted to the worm-shaft-side coupling member 80, whereby both members rotate together.

According to the rotation of the worm-shaft-side coupling member 80, the rotary force is transmitted from the concave/convex hole 81 d to the serration portion 43d, and the worm shaft 43 rotates. Then, according to the rotation of the worm shaft 43, the worm wheel 44 rotates. Therefore, the pinion 53 of the worm wheel 44 rotates in one direction, and the window glass is closed via the window regulator.

[CCW Rotation]

When the operation switch is operated to open the window glass, the predetermined driving current is supplied to each brush 30, and the armature shaft 25 rotates in a counter-clockwise direction (CCW rotation). Then, as depicted in FIG. 7B, the armature-shaft-side coupling member 70 also rotates in a CCW rotation direction according to the CCW rotation of the armature shalt 25, and each protruding portion 71 of the armature-shaft-side coupling member 70 comes near to each protruding portion 81a of the worm-shaft-side coupling member 80. At this time, since the swelling portion 83a of the cushion member 83 is disposed between each protruding portion 71 and each protruding portion 81a, this swelling portion 83a serves as a shock absorber to suppress the occurrence of unusual sound. Thereafter, a rotary force from the armature-shaft-side coupling member 70 is transmitted to the worm-shaft-side coupling member 80, whereby both members rotate together.

According to the rotation of the worm-shaft-side coupling member 80, the rotary force is transmitted from the concave/convex hole 81d to the serration portion 43d, and the worm shaft 43 rotates. Then, according to the rotation of the worm shalt 43, the worm wheel 44 rotates. Therefore, the pinion 53 of the worm wheel 44 rotates in the other direction, and the window glass is opened via the window regulator.

Here, even in both of the CW rotation and the CCW rotation, driving resistance and the like of the window regulator is transmitted via the pinion 53 to the worm wheel 44 and the worm shaft 43. Therefore, the serration portion 43d rotates together in an eccentric state of a direction indicated by an arrow "M" of FIG. 8 with respect to the worm-shaft-side coupling member 80 since there is the micro-gap between the serration portion 43d and the concave/convex hole 81d. At this time, the relative rotatable angle formed by the concave/convex hole 81d and the serration portion 43d is approximately 0 degree. Therefore, a rotation state of the worm shaft 43 is approximately similar to a rotation state of the sensor magnet 84. Accordingly, the rotation state of the worm shaft 43, that is, a driving state on a window regulator side can be detected by each Hall IC 52 with good accuracy.

As described in detail above, according to the motor with speed reduction mechanism 10 in the present embodiment, the armature-shaft-side coupling member 70 is provided together rotatably to the other end of the armature shaft 25; the worm-shaft-side coupling member 80 is provided together rotatably to one end of the worm shalt 43; the armature-shaft-side coupling member 70 and the worm-shaft-side coupling member 80 are coupled together rotatably; and the sensor magnet 84 is provided together rotatably to the worm-shaft-side coupling member 80. Accordingly, the rotation state of the worm shaft 43 can be detected with good accuracy. Therefore, even if any play is provided between the armature-shaft-side coupling member 70 and the worm-shaft-side coupling member 80, this play does not affect accuracy of detection of the rotation state of the worm shaft 43, and so does not also bring any problem regarding the accuracy of detection of the rotation state of a worm wheel 44 side. Furthermore, since any play can be provided between the armature-shaft-side coupling member 70 and the worm-shaft-side coupling member 80, workability of assembling the motor with speed reduction mechanism 10 can be ensured, whereby an increase in manufacturing cost can be suppressed.

Also, according to the motor with speed reduction mechanism 10 in the present embodiment, the sensor magnet 84, the sensor substrate 51 including the Hall ICs 52 that detect a rotation state of the sensor magnet 84, and the connector connecting portion 42b to which an external connector is connected are provided in parallel toward a radial direction of the worm shalt 43; and the sensor substrate 51 is disposed between the sensor magnet 84 and the connector connecting portion 42b. Accordingly, by disposing each Hall IC 52 near the connector connecting portion 42b, each terminal 50 provided between each Hall IC 52 and the connector connecting portion 42b can be shortened in length.

Furthermore, according to the motor with speed reduction mechanism 10 in the present embodiment, the connector connecting portion 42b is provided integrally with the clipping portion 42a that is clipped between the yoke 21 and the gear case 41 and overlaps with the brush holder 29 toward an axial direction of the worm shaft 43; and the sensor substrate 51 is assembled to the clipping portion 42a. Accordingly, each Hall IC 52 can be provided so as to be spaced apart from each brush 30, and this can prevent electric noise, and abrasion powder, etc. from reaching each Hall IC 52, whereby a decrease in detection sensitivity of each Hall IC 52 can be suppressed.

Needless to say, the present invention is not limited to the above-described embodiment, and may variously altered within a score of not departing from the gist of the present invention. For example, shown in the above-mentioned embodiment is, as depicted in FIG. 1, a structure in which the sensor substrate 51 is provided so that each Hall IC 52 is oriented to a sensor magnet 84 side and that the wall portion 42c is disposed between each Hall IC 52 and the sensor magnet 84. However, the present invention is not limited to such a structure.

Figure 9:
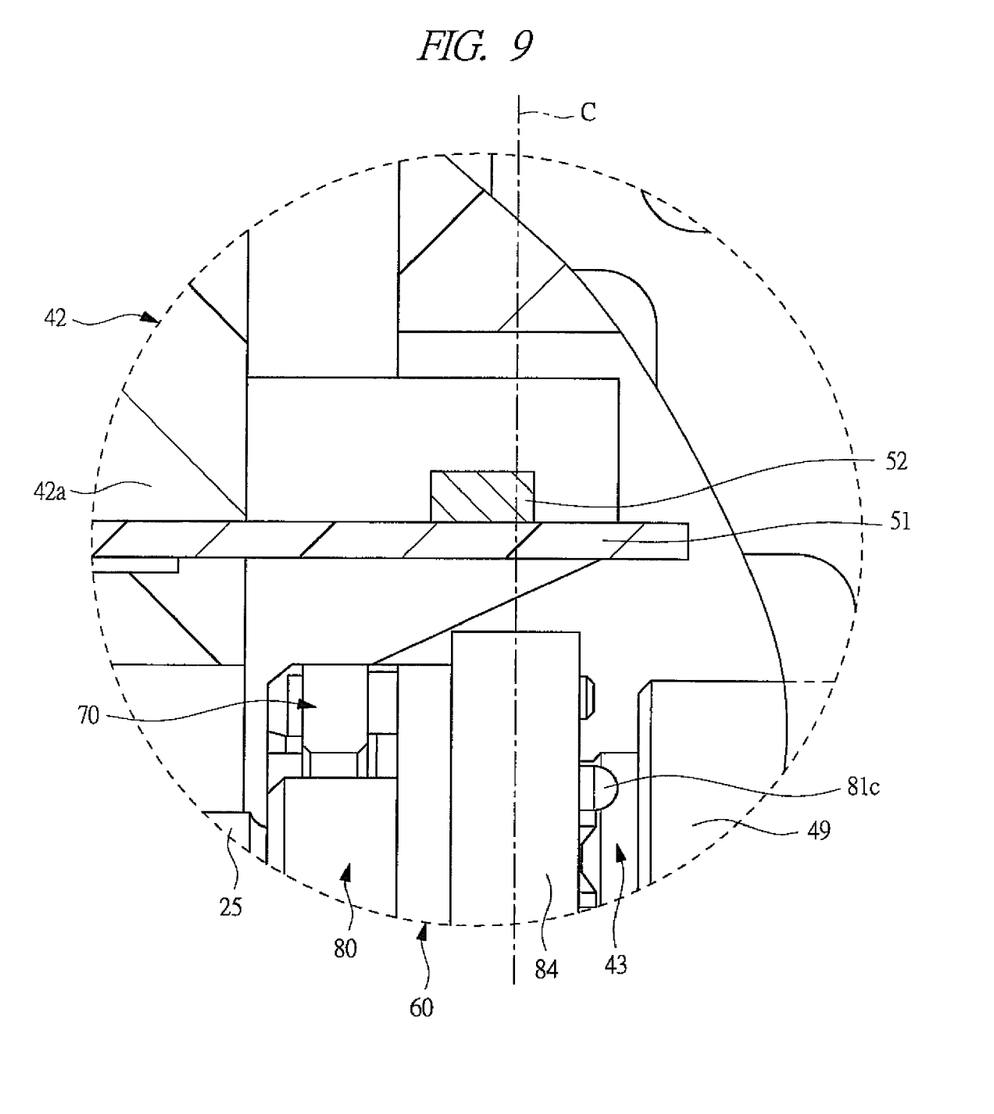
FIG. 9 is an enlarged view of a modification example corresponding to a portion indicated by a dotted circle "A" in FIG. 1.

Namely, as depicted in FIG. 9, the sensor substrate 51 can be provided so that each Hall IC 52 is oriented to a side opposite to the sensor magnet 84 side, and the wall portion 42c between each Hall IC 52 and the sensor magnet 84 can be omitted. Even in this case, since the sensor substrate 51 serves as a barrier, abrasion powder etc. from each brush 30 can be prevented from reaching each Hall IC 52. Also, since the wall portion 42c is not provided, a shape of the connector member 42 can be simplified and made compact. Note that FIG. 9 represents an enlarged view of a modification example corresponding to a portion indicated by the dotted circle A in FIG. 1, and portions having similar functions as those of the above-described embodiment are denoted by the same reference numerals.

Furthermore, shown in the above-described embodiment is a structure in which: the brush holder 29 and the connector member 42 are set as separate elements; the brush holder 29 is set as a component located on the motor section 20 side; and the connector member 42 is set as a component located on the gear section 40 side. However, the present invention is not limited to this structure, and the brush holder and the connector member may be integrated together. In this case, the integrated "brush-holder & connector-member assembly" may be mounted on either one of the yoke 21 and the gear case 41.

Still further, shown in the above-described embodiment is a structure in which the motor with speed reduction mechanism 10 is used as a driving source of a power-window apparatus loaded on the vehicle. However, the present invention is not limited to this structure, and the motor with speed reduction mechanism 10 may be used as another driving source such as a sun-roof apparatus.

Still further, in the above-described embodiment, filling of the resin material 47 for adjusting a position of the second thrust bearing 45 in a worm-shaft direction is performed after assembling of the motor with speed reduction mechanism 10. However, the present invention is not limited to such a filling way, and for example, by assembling the motor section 20 and the connector member 42 to the gear section 40 in a state where the worm wheel 44 is not assembled to the gear section 40, the worm wheel 44 may be assembled to the gear section 40 after the filling of the resin material 47.

What is claimed is:

1. A motor with speed reduction mechanism, comprising a motor section, and a gear section decelerating rotation of the motor section, the motor section including:
    a bottomed cylindrical yoke;
    an armature shaft rotatably provided in the yoke, one end of the armature shaft being supported by a bottom portion of the yoke;
    a commutator mounted to an other end side of the armature shaft;
    a brush holder covering an opening portion of the yoke, mounted by being press-fitted into the yoke, and rotatably supporting the other end side of the armature shaft;
    a brush held by the brush holder and slidably contacting with the commutator;
    and an armature-shaft-side coupling member provided to the other end of the armature shaft so as to be rotatable together with the armature shaft, and provided with protruding portions, and
    the gear section including:
    a bottomed gear case mounted on the opening portion of the yoke;
    a worm shaft provided in the gear case so as to be rotatable with respect to the gear case, the other end of the worm shaft being supported by a bottom portion of the gear case, and a worm being formed on the worm shaft;
    a worm wheel provided in the gear case so as to be rotatable with respect to the gear case, and meshing with the worm of the worm shaft;
    a worm-shaft-side coupling member provided to one end of the worm shaft so as to be rotatable together with the worm shaft, and provided with protruding portions, the worm-shaft-side coupling member being coupled together rotatably to the armature-shaft-side coupling member, wherein a gap is formed between each protruding portion of the worm-shaft-side coupling member and each protruding portion of the armature-shaft-side coupling member along the circumferential direction; and
    a sensor magnet integrally provided around an outer circumference of an attaching ring attached to the worm-shaft-side coupling member.

2. The motor with speed reduction mechanism according to claim 1, further comprising a connector member provided with a connector connecting portion, to which an external connector is connected, wherein
    the connector member is provided with a sensor substrate, which has a magnet sensor for detecting a rotation state of the sensor magnet, the sensor substrate and the connector connecting portion are provided in parallel toward a radial direction of the worm shaft, and the sensor substrate is disposed between the sensor magnet and the connector connecting portion.

3. The motor with speed reduction mechanism according to claim 2, wherein the connector member is provided integrally with a clipping portion, which is clipped between the yoke and the gear case and which overlaps with the brush holder toward an axial direction of the worm shaft, and the sensor substrate is assembled to the clipping portion.

* * * * *